(12) United States Patent
Mowforth

(10) Patent No.: US 10,680,960 B2
(45) Date of Patent: Jun. 9, 2020

(54) DYNAMIC RATE LIMITING FOR NETWORKED RESOURCES

(71) Applicant: Rapid7, Inc., Boston, MA (US)

(72) Inventor: Chris Mowforth, Dublin (IE)

(73) Assignee: Rapid7, Inc., Boston, MA (US)

( * ) Notice: Subject to any disclaimer, the term of this patent is extended or adjusted under 35 U.S.C. 154(b) by 42 days.

(21) Appl. No.: 16/211,457

(22) Filed: Dec. 6, 2018

(65) Prior Publication Data

US 2019/0268271 A1 Aug. 29, 2019

Related U.S. Application Data

(60) Provisional application No. 62/636,803, filed on Feb. 28, 2018.

(51) Int. Cl.
| | |
|---|---|
| *H04L 12/815* | (2013.01) |
| *H04L 12/867* | (2013.01) |
| *H04L 12/24* | (2006.01) |
| *H04L 12/825* | (2013.01) |
| *H04L 12/801* | (2013.01) |

(52) U.S. Cl.
CPC ........ *H04L 47/225* (2013.01); *H04L 41/0826* (2013.01); *H04L 47/127* (2013.01); *H04L 47/25* (2013.01); *H04L 47/629* (2013.01)

(58) Field of Classification Search
CPC ...... H04L 47/225; H04L 47/25; H04L 47/629
See application file for complete search history.

(56) References Cited

U.S. PATENT DOCUMENTS

| | | | |
|---|---|---|---|
| 6,230,203 B1 * | 5/2001 | Koperda | H04J 3/1694 348/E7.07 |
| 2004/0107284 A1 * | 6/2004 | Koperda | H04J 3/1694 709/229 |
| 2013/0155961 A1 * | 6/2013 | Brunnenmeyer | H04B 7/18584 370/329 |

* cited by examiner

*Primary Examiner* — Ayaz R Sheikh
*Assistant Examiner* — Debebe A Asefa
(74) *Attorney, Agent, or Firm* — Danielson Legal LLC

(57) ABSTRACT

Rate limiting systems and methods for regulating access to a shared network resource in a computing device accessed through an application programming interface. A rate limit associated with a shared network resource is assigned to a user for a time period. During the time period, access to the shared network resource is granted or denied repeatedly based upon the rate limit; a cost is calculated using a cost function; and, the rate limit is updated based upon the cost.

20 Claims, 4 Drawing Sheets

DYNAMIC RATE LIMITING FOR NETWORKED RESOURCES

CROSS-REFERENCE TO RELATED APPLICATIONS

The present application claims benefit of U.S. provisional application No. 62/636,803, filed on Feb. 28, 2018, the entire disclosure of which is incorporated by reference as if set forth in its entirety herein.

TECHNICAL FIELD

This invention generally relates to systems and methods for computer resource management and, more particularly but not exclusively, to systems and methods for regulating access to a shared network resource (e.g., a RESTful resource) in order to ensure fair access.

BACKGROUND

Cloud computing allows a large number of users ubiquitous access to shared computer resources. Typically, a user can use (i.e. provision) a shared network resource rapidly and with minimal management oversight. Benefits from employing shared network resources has lead to the nearly ubiquitous adoption of cloud computing by most internet-based services and applications.

However, in spite of its manifest benefits, a shared network resource can be a source of interdependences and coupling between different functions and users. For example, coupling occurs when a use of a shared network resource by a first user overwhelms the resource and a second user is left without access. In some circumstances the second user requires the shared network resource to complete a task. In this case the task will remain undone as long as the shared network resource is being used by the first user. This is sometimes referred to as the "noisy neighbor" problem.

A challenge for resource sharing is that each use of a resource is likely to differ in time it takes to complete as well as the stress it places on the resource. This problem is not solved by allocating a fixed number of uses of the shared network resource to each user over a given time period, as a user with more intensive uses will monopolize the resource.

Therefore a need exists for methods and systems for ensuring fair and reliable access to a shared network resource, and in particular to RESTful network resources (i.e., a resource that complies with the representational state transfer (i.e., REST model).

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a rate limiting method for ensuring fair access to a shared network resource in a computing device. The method includes assigning, using a configured processor, a rate limit associated with a shared network resource to a user for a time period; initializing, using the configured processor, the time period; and performing repeatable steps during the time period, including deciding, using the configured processor, whether to grant a use of the shared network resource to the user based upon the rate limit; calculating, using the configured processor, a cost using a cost function; and updating, using the configured processor, the rate limit using the cost.

In some embodiments of the method, the shared network resource is accessed through an application programming interface.

In some embodiments of the method, the cost function accepts as input the rate limit and at least one of a total use time, a resource load, and an estimated use load and returns as output the cost.

In some embodiments of the method, the cost function comprises at least one of decrementing the rate limit; and dividing the rate limit by a variable.

In some embodiments of the method, deciding whether to grant the use includes comparing the rate limit with a threshold value.

In some embodiments of the method, the use includes a communication over a network.

In some embodiments of the method, the repeatable steps further comprise selectively performing, using the configured processor, the use of the shared network resource for the user based upon the rate limit.

In another aspect, embodiments relate to a rate limiting system configured to ensure fair access to a shared network resource in a computing device. The system includes a shared network resource configured for use by a plurality of users. The system also includes a configured processor configured to perform operations, including assigning a rate limit associated with the shared network resource to a user for a time period; initializing the time period; and performing repeatable steps during the time period, including deciding whether to grant a use of the shared network resource to the user based upon the rate limit; calculating a cost using a cost function; and updating the rate limit using the cost.

In some embodiments of the system, the shared network resource is accessed through an application programming interface.

In some embodiments of the system, the cost function accepts as input the rate limit and at least one of a total use time, a resource load, an anticipated resource load, and an estimated use load and returns as output the cost.

In some embodiments of the system, the cost function includes at least one of decrementing the rate limit; and dividing the rate limit by a variable.

In some embodiments of the system, the repeatable step of deciding whether to grant the use comprises comparing the rate limit with a threshold value.

In some embodiments of the system, the system further includes a network interface configured to provide the use with a communication over a network.

In some embodiments of the system, the repeatable steps further comprise selectively reforming the use of the shared network resource for the user based upon the rate limit.

In yet another aspect, some embodiments relate to a non-transitory computer readable media storing instructions that are executable by a processing device. Upon execution of the instructions, the processing device performs operations that include assigning a rate limit associated with a shared network resource to a user for a time period; initializing the time period; and performing repeatable steps during the time period, including deciding whether to grant a use of the shared network resource to the user based upon the rate limit; calculating a cost using a cost function; and updating the rate limit using the cost.

In some embodiments of the non-transitory computer readable media storing instructions, the cost function accepts as input the rate limit and at least one of a total use time, a resource load, and an estimated use load and returns as output the cost.

In some embodiments of the non-transitory computer readable media storing instructions, the cost function includes at least one of decrementing the rate limit; and dividing the rate limit by a variable.

In some embodiments of the non-transitory computer readable media storing instructions, deciding whether to grant the use includes comparing the rate limit with a threshold value.

In some embodiments of the non-transitory computer readable media storing instructions, the use includes a communication over a network.

In some embodiments of the non-transitory computer readable media storing instructions, the repeatable steps further include selectively performing the use of the shared network resource for the user based upon the rate limit.

Any combination and permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
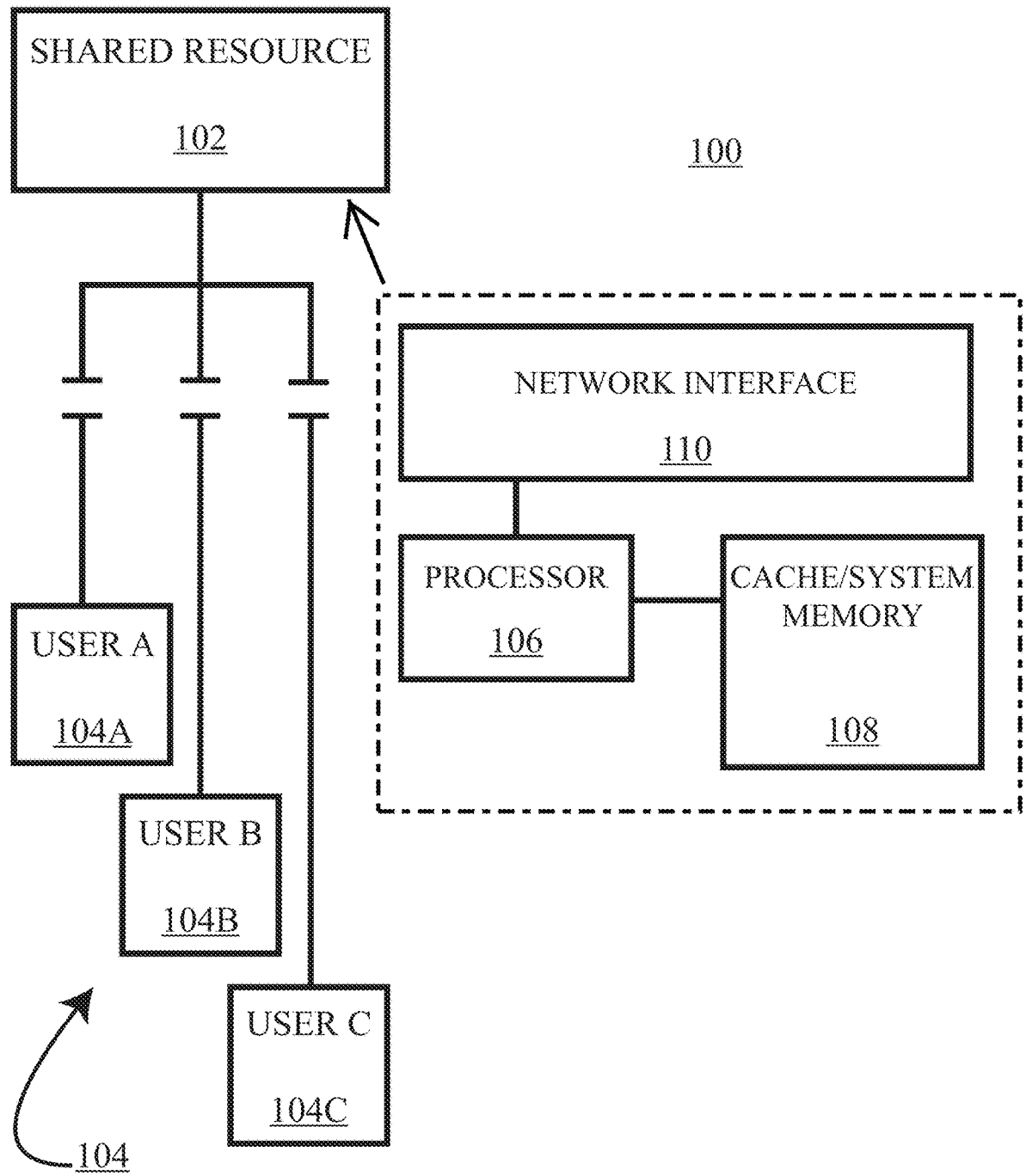
FIG. 1 illustrates a sample networked resource sharing system in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

FIG. 1 illustrates a sample resource sharing system 100 in accordance with one embodiment. The resource sharing system 100 regulates use of a shared network resource 102 accessed by a plurality of users 104 through an application programming interface (API). Examples of shared network resources include, e.g., a query resource used in logsearch and accessible over the Internet through a RESTful API offered through a cloud computing system and other so-called RESTful resources. According to some embodiments, the resource sharing system 100 comprises a configured processor 106, a cache/system memory 108, and a network interface 110. The configured processor 106 is configured to decide whether a user 104A, 104B, and 104C is to be granted a use of the shared network resource 102, which in some embodiments is made available by the processor 106 executing instructions stored on a computer-readable medium that when executed provide the service. According to some embodiments, the resource sharing system 100 comprises the shared network resource 102. Alternatively, the shared network resource 102 is remote from the resource sharing system 100 in other embodiments.

Figure 2:
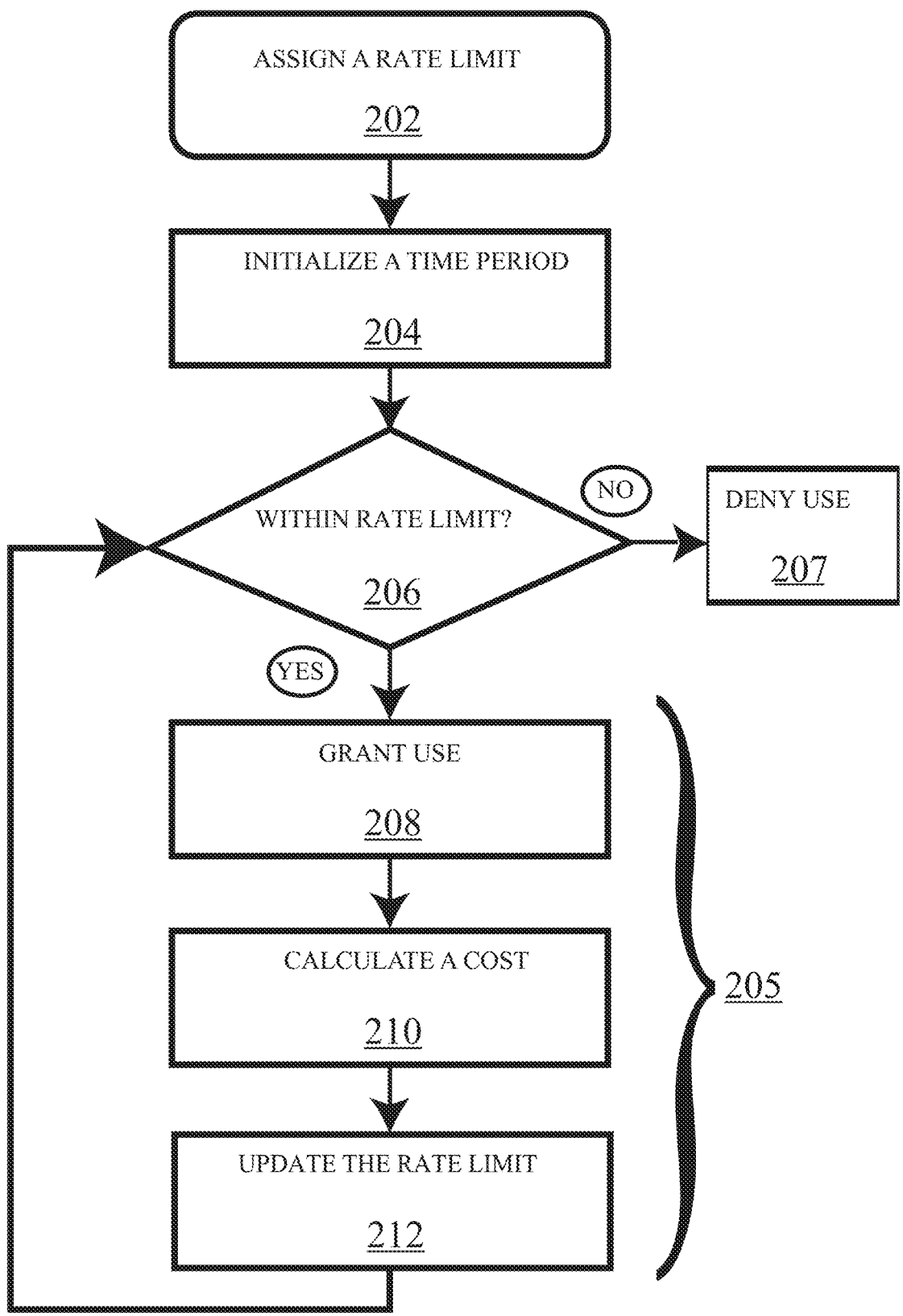
FIG. 2 presents a flowchart of a method for regulating access to a shared network resource in accordance with one embodiment.

FIG. 2 presents a flowchart of a method for regulating access to a shared network resource such as a RESTful resource in accordance with one embodiment. A configured processor first assigns a rate limit 202 for the shared network resource to a user for a time period commencing when the first request in a new period is received. In some embodiments, the rate limit represents a fixed upper limit of uses over the time period, or a rate limit. The configured processor initializes the time period 204. Throughout the time period the processor performs repeatable steps 205. According to some embodiments, the present time is measured by way of a system time. The system time may be provided by at least one of a real-time clock (RTC) and a programmable interval timer (PIT), which operates on the processor. According to another embodiment, the present time is measured by way of a process time, which is typically a tally of the processor's clock cycles. The repeatable steps 205 are executed during the time period when the user requests a use of the shared network resource. The processor decides whether to deny 207 or grant a use 208 of the shared network resource to the user based upon the user's rate limit 206. For example, according to some embodiments, when the rate limit drops below a threshold value (e.g. 0) the user is denied the use of the resource. The processor calculates a cost using a cost function 210 and the rate limit is updated based upon the cost. The cost function is derived to ensure fair and continuing access to the shared network resource in the face of changing uses and system loads. The cost function is shown below $$f(X):X \rightarrow Y$$

where X is an input, typically X is a previous rate limit of the user, and Y is an output, typically a current rate limit. For most practical applications X and Y range over a positive set of integers. According to a typical embodiment, the cost function is derived such that X is always greater than or equal to Y, such that the cost function can only increase the cost of a use (not lower it). According to some embodiments, the cost function includes simple rate limiting and decrementing, such as $$f(X)=X-1$$

In the case of decrementing the cost of a use is generally 1. However, under many circumstances it is appropriate to increase the cost of a use to prevent overloading of a shared network resource. According to some embodiments, the cost function takes as input not only the rate limit of the user, but other variables, for example a total use time. The total use time of a user is the total cumulative time the user has used the shared network resource over a given time. According to some versions, the total use time associated with a user is tracked in an in-memory cache (e.g. Redis) and the cost function calculates the cost in part upon the total use time. For example, an example cost function is shown below which proportions the cost of a use according to the total use time by a user $$f(X, totalTime) = \frac{X}{totalTime}$$

where totalTime is the total use time. It can be seen that as totalTime becomes larger the output of the cost function (the current rate limit) becomes smaller. This effectively increases the cost of use and reduces the rate limit (and therefore the number of uses) by a user who has been using the shared network resource for much of the time. Proportioning the cost according to the total use time does not obtrusively affect a shared network resource that is stable and unstressed as the total use time of the shared network resource will remain low. It may be desirable in some situations to have the use of a shared network resource regulated differently depending upon the current load it is under.

According to some embodiments, the cost function is dynamic and reactively takes different forms depending upon a variable indicative of the shared network resource's load. For example, system load (e.g. 0%-100%) may be used to indicate the load of a shared network resource.

$$f(X, totalTime, resourceLoad) = \begin{cases} X - 1 \text{ when } resourceLoad \leq T; \\ \frac{X}{totalTime} \text{ when } resourceLoad > T; \end{cases}$$

where T is an externally configurable threshold value above which the system is considered heavily loaded, and resourceLoad is a metric indicative of stress on the resource. It may be desirable in some circumstances not to wait to throttle uses until the resource is heavily loaded, but to instead proactively adjust the cost of a use based upon an anticipated stress the use is expected to place on the resource.

According to another embodiment, the cost function proactively adjusts the cost of a use based upon the stress it is anticipated to place upon the shared network resource. Heuristics may be used to quickly estimate the load a use will place on a shared network resource and the cost of the use is adjusted accordingly, i.e.:

$$f(X, useLoad) = \frac{X}{useLoad}$$

where useLoad is an estimate of the estimated load a use will place upon a shared network resource.

According to an example embodiment, a rate limiting system ensures fair and continuing access to an API which provides a plurality of users with access to issue arbitrary query requests over HTTP against their stored log data. Typically, an amount of system resources required to service these requests varies widely. Simply allocating a fixed number of requests over a time period to a user and decrementing the number of events with each use may not provide fairness and exacerbate the "noisy neighbor" problem. For example, a number of intensive queries issued in rapid succession by a single user would cause excessive disk I/O and negatively impact query execution time for all users.

Instead, the log search API example of the rate limiting system uses a cost function operating within a time window and at least one of a total use time variable, a system load variable, and an estimated use load variable to regulate access to the log data. For example, in some versions the total use time for a user is calculated as a total cumulative query execution time for queries requested by the user. The cost function in some versions proportions a cost of a use for the user based upon his total use time. This has the effect of more aggressively throttling users issuing complex, longer-running queries. According to some versions, the system load variable is related to a successive failures metric, such that more successive failures of an internal call result in a larger system load variable. The cost function in some versions dynamically alters its behavior in situations where the system load variable is greater than a configurable threshold, above which the system resources are believed to be heavily loaded. For example, during periods with relatively few successive internal call failures the cost function simply decrements the rate limit with each use. And, during periods having a relatively large (i.e., above the threshold value) number of successive internal call failures the cost function proportions the rate limit according to the user's total use time. According to some versions, the estimated use load variable is a query complexity parameter that represents a cyclomatic complexity of the user's requested query. According to some embodiments, the query complexity parameter is selected such that it is quickly and deterministically estimable and the cost function proactively proportions the rate limit according to the query complexity parameter for the current window or for future window.

Figure 3:
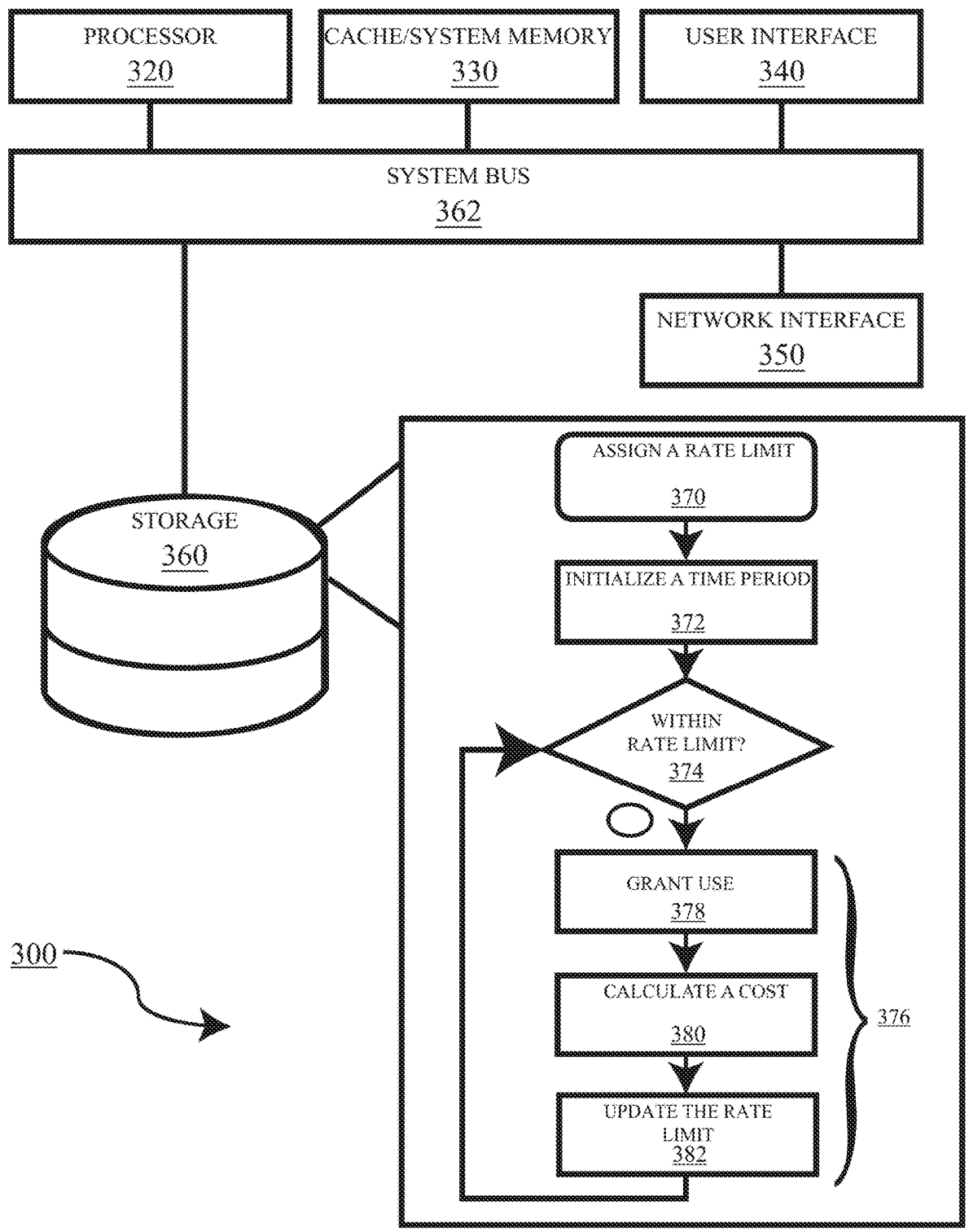
FIG. 3 depicts a system for regulating access to a shared network resource in accordance with one embodiment.

Referring now to FIG. 3, a system for regulating access to a shared network resource over the Internet, e.g., a RESTful resource, in accordance with one embodiment is shown. The system 300 may include a processor 320, memory 330, a user interface 340, a network interface 350, and storage 360, all interconnected via one or more system buses 362. It will be understood that FIG. 3 constitutes, in some respects, an abstraction and that the actual organization of the system 300 and the components thereof may differ from what is illustrated.

The processor 320 may be any hardware device capable of executing instructions stored on memory 330 and/or in storage 360, or otherwise any hardware device capable of processing data. As such, the processor 320 may include a microprocessor, field programmable gate array (FPGA), an application-specific integrated circuit (ASIC), or other similar devices.

The memory 330 may include various transient memories such as, for example L1, L2, or L3 cache or system memory. As such, the memory 330 may include static random access memory (SRAM), dynamic RAM (DRAM), flash memory, read only memory (ROM), or other similar memory devices and configurations.

The user interface 340 may include one or more devices for enabling communication with system operators and other personnel. For example, the user interface 340 may include a display, a mouse, and a keyboard for receiving user commands. In some embodiments, the user interface 340 may include a command line interface or graphical user interface that may be presented to a remote terminal via the network interface 350. The user interface 340 may execute on a user device such as a PC, laptop, tablet, mobile device, or the like, and may enable a user to review vulnerable resources and processes, for example.

The network interface 350 may include one or more devices for enabling communication with other remote devices to access a target computer for vulnerability inference. The network interface 350 may also allow for downloading of updates to software applications (e.g. resources and processes) that contain vulnerabilities. For example, the network interface 350 may include a network interface card (NIC) configured to communicate according to the Ethernet protocol. Additionally, the network interface 350 may implement a TCP/IP stack for communication according to the TCP/IP protocols over various networks including the network of networks known colloquially as the Internet. Various alternative or additional hardware or configurations for the network interface 350 will be apparent.

The storage 360 may include one or more machine-readable storage media such as read-only memory (ROM), random-access memory (RAM), magnetic disk storage media, optical storage media, flash-memory devices, or similar storage media. In various embodiments, the storage 360 may store instructions for execution by the processor 320 or data upon which the processor 320 may operate.

For example, the storage 360 may include instructions to assign a rate limit associated with a shared network resource to a user for a time period 370; initialize the time period 372; ensuring that a present time is within the time period 374; and performing repeatable steps during the time period 376. The repeatable steps may include deciding whether to grant a use of the shared network resource to the user based upon the rate limit 378; calculating a cost associated with the use using a cost function 380; and updating the rate limit based upon the cost 382.

Instructions to assign a rate limit 370 may include setting a maximum fixed number of uses of a shared network resource available to a user over a time period, or said another way a maximum rate of uses.

Instructions to initialize the time period 372 may include instructions to store in memory 330 an initialization time. According to some embodiments, the initialization time is queried from a clock, for example a real-time clock (RTD) included with the processor 320.

Instructions to ensure that the present time is within the time period 374 may include instructions to query the present time on at least one of a system time and a process time and to compare the retrieved time to the time of the receipt of the first request and the opening of the window. According to some embodiments, instructions to query the present time include querying the processor 320. According to some embodiments, ensuring that the present time is within the time period 374 includes instructions to compare the present time with the initialization time stored in memory 330.

Instructions to perform the repeatable steps 376 may include instructions to decide whether to grant a use 378; instructions to calculate a cost 380; and instructions to update the rate limit 382. The instructions whether to grant a use of a shared network resource to a user 378 may include instructions to compare the rate limit of the user against a threshold value. For example, if the rate limit is not greater than the threshold value of 0, the use is not granted to the user. According to some embodiments, the system may comprise the shared network resource. In this case, deciding whether to grant a use of the shared user 370 may include performing the use with one or more components of the system 300, for example one of: the processor 320, the system memory 330, the user interface 340, and the system bus 362.

Instructions for calculating a cost of the use 380 may include instructions to calculate a cost function that takes as input at least one of the rate limit, a total use time variable, a shared network resource load variable, and an estimated use load variable.

Instructions for updating the rate limit based upon the cost 382 may include instructions to set the rate limit value equal to a returned value of the cost function. For example according to some embodiments, the rate limit is set to a value generally equal to a previous rate limit value minus the cost.

Figure 4:
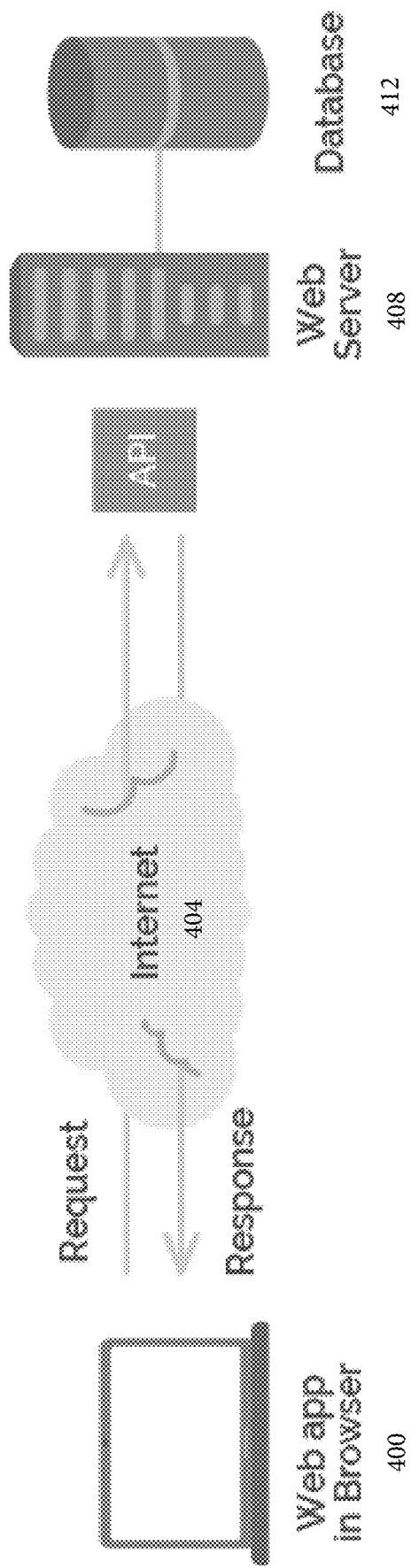
FIG. 4 shows one embodiment with a web server rate limiting access to a shared network resource.

FIG. 4 shows one embodiment where a web server 408 rate limits access to a networked resource, namely database 412. In this embodiment, a web app executing in a web browser 400 ultimately sends and/or retrieves data from database 412. The web app 400 does not itself have direct access to the database 412 because it is often geographically remote from the computer implementation of database 412. Thus, web app 400 communicates its database requests over a LAN or WAN like the Internet 404.

The database 412 communicates over the Internet 404 via a web server 408, which is typically configured to process requests from web apps like web app 400. In this embodiment, web server 408 is further configured to implement the rate-limiting techniques discussed above.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A rate limiting method for ensuring fair access to a shared network resource in a computing device, the method comprising:
   assigning, using a configured processor, a rate limit associated with a shared network resource to a user for a time period;
   initializing, using the configured processor, the time period; and
   performing repeatable steps during the time period, the repeatable steps comprising:
      deciding, using the configured processor, whether to grant a use of the shared network resource to the user based upon the rate limit;
      calculating, using the configured processor, a cost using a cost function, wherein the cost function used is dependent on a total load of the shared network resource such that a first cost function is used when a total load is equal to or less than a threshold, and a second cost function is used when the total load exceeds the threshold; and
      updating, using the configured processor, the rate limit using the cost.

2. The method of claim 1 wherein the shared network resource is accessed through an application programming interface.

3. The method of claim 1 wherein the cost function accepts as input the rate limit and at least one of a total use time, a resource load, and an estimated use load and returns as output the cost.

4. The method of claim 1 wherein the cost function comprises at least one of decrementing the rate limit; and dividing the rate limit by a variable.

5. The method of claim 1 wherein deciding whether to grant the use comprises comparing the rate limit with a threshold value.

6. The method of claim 1 wherein the use comprises a communication over a network.

7. The method of claim 1 wherein the repeatable steps further comprise selectively performing, using the configured processor, the use of the shared network resource for the user based upon the rate limit.

8. A rate limiting system for ensuring fair access to a shared network resource in a computing device, the system comprising:
- a shared network resource configured for use by a plurality of users; and
- a configured processor configured to:
  - assign a rate limit associated with the shared network resource to a user for a time period;
  - initialize the time period; and
  - perform repeatable steps during the time period, the repeatable steps comprising:
    - deciding whether to grant a use of the shared network resource to the user based upon the rate limit;
    - calculating a cost using a cost function, wherein the cost function used is dependent on a total load of the shared network resource such that a first cost function is used when a total load is equal to or less than a threshold, and a second cost function is used when the total load exceeds the threshold; and
    - updating the rate limit using the cost.

9. The system of claim 8 wherein the shared network resource is accessed through an application programming interface.

10. The system of claim 8 wherein the cost function accepts as input the rate limit and at least one of a total use time, a resource load, and an estimated use load and returns as output the cost.

11. The system of claim 8 wherein the cost function comprises at least one of decrementing the rate limit; and dividing the rate limit by a variable.

12. The system of claim 8 wherein the repeatable step of deciding whether to grant the use comprises comparing the rate limit with a threshold value.

13. The system of claim 8 further comprising a network interface configured to provide the use with a communication over a network.

14. The system of claim 8 wherein the repeatable steps further comprise selectively performing the use of the shared network resource for the user based upon the rate limit.

15. One or more non-transitory computer readable media storing instructions that are executable by a processing device, and upon such execution cause the processing device to perform operations comprising:
- assigning a rate limit associated with a shared network resource to a user for a time period;
- initializing the time period; and
- performing repeatable steps during the time period, the repeatable steps comprising:
  - deciding whether to grant a use of the shared network resource to the user based upon the rate limit;
  - calculating a cost using a cost function, wherein the cost function used is dependent on a total load of the shared network resource such that a first cost function is used when a total load is equal to or less than a threshold, and a second cost function is used when the total load exceeds the threshold; and
  - updating the rate limit using the cost.

16. The non-transitory computer readable media according to claim 15 wherein the cost function accepts as input the rate limit and at least one of a total use time, a resource load, and an estimated use load and returns as output the cost.

17. The non-transitory computer readable media according to claim 15 wherein the cost function comprises at least one of decrementing the rate limit; and dividing the rate limit by a variable.

18. The non-transitory computer readable media according to claim 15 wherein deciding whether to grant the use comprises comparing the rate limit with a threshold value.

19. The non-transitory computer readable media according to claim 15 wherein the use comprises a communication over a network.

20. The non-transitory computer readable media according to claim 15 wherein the repeatable steps further comprise selectively performing the use of the shared network resource for the user based upon the rate limit.

* * * * *